United States Patent
Corbille et al.

(10) Patent No.: US 12,259,590 B2
(45) Date of Patent: Mar. 25, 2025

(54) FIBER-OPTIC APPARATUS

(71) Applicant: Corning Research & Development Corporation, Corning, NY (US)

(72) Inventors: Christophe Joseph Marie Corbille, Saint Nicolas de Redon (FR); Mickael Yann Daniel Gormand, Pontchateau (FR); Michel Teva Menguy, La Chevallerais (FR)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 207 days.

(21) Appl. No.: 17/984,513

(22) Filed: Nov. 10, 2022

(65) Prior Publication Data
US 2023/0168455 A1    Jun. 1, 2023

Related U.S. Application Data

(60) Provisional application No. 63/283,618, filed on Nov. 29, 2021.

(51) Int. Cl.
*G02B 6/44* (2006.01)
*G02B 6/255* (2006.01)

(52) U.S. Cl.
CPC ......... *G02B 6/4454* (2013.01); *G02B 6/4471* (2013.01); *G02B 6/255* (2013.01)

(58) Field of Classification Search
None
See application file for complete search history.

(56) References Cited

U.S. PATENT DOCUMENTS

| | | | |
|---|---|---|---|
| 6,195,496 B1 * | 2/2001 | Daoud | G02B 6/3801 385/136 |
| 6,240,236 B1 * | 5/2001 | Daoud | G02B 6/3801 385/136 |
| 6,249,635 B1 * | 6/2001 | Daoud | G02B 6/4471 385/59 |
| 6,249,636 B1 * | 6/2001 | Daoud | G02B 6/4471 385/136 |
| 6,434,313 B1 | 8/2002 | Clapp et al. | |
| 10,845,561 B1 * | 11/2020 | Courchaine | G02B 6/4454 |

(Continued)

FOREIGN PATENT DOCUMENTS

| DE | 102016008729 B4 | 5/2019 |
|---|---|---|
| WO | 2009/091457 A1 | 7/2009 |

OTHER PUBLICATIONS

European Patent Application No. 22209737.0, Extended European Search Report, dated Mar. 24, 2023; 11 pages; European Patent Office.

*Primary Examiner* — Jerry Rahll
(74) *Attorney, Agent, or Firm* — Tamika A. Crawl-Bey (57) ABSTRACT

A fiber-optic apparatus is disclosed, comprising a base; an optical splitter portion disposed on the base and configured to retain an optical splitter; a first fiber splicing portion, the first fiber splicing portion disposed on the base and configured to retain a plurality of optical fiber splices connecting to an optical splitter; and wherein the first fiber splicing portion is configured to retain a plurality of optical fiber splices such that an end of at least a first optical fiber splice is offset from an end of at least a second optical fiber splice in the direction of the depth of the apparatus.

18 Claims, 4 Drawing Sheets

(56) References Cited

U.S. PATENT DOCUMENTS

| | | | |
|---|---|---|---|
| 2002/0159744 A1* | 10/2002 | Daoud | G02B 6/3801 |
| | | | 385/135 |
| 2007/0047891 A1* | 3/2007 | Bayazit | G02B 6/4471 |
| | | | 385/135 |
| 2007/0047892 A1* | 3/2007 | Bayazit | G02B 6/4454 |
| | | | 385/135 |
| 2009/0067804 A1* | 3/2009 | Knorr | G02B 6/4471 |
| | | | 385/137 |
| 2011/0280535 A1* | 11/2011 | Womack | G02B 6/4471 |
| | | | 385/135 |
| 2014/0205254 A1* | 7/2014 | Rudenick | G02B 6/444 |
| | | | 385/135 |
| 2015/0268436 A1 | 9/2015 | Blackwell et al. | |
| 2016/0238811 A1* | 8/2016 | Simmons | G02B 6/4442 |

* cited by examiner

FIBER-OPTIC APPARATUS

RELATED APPLICATION

The present application claims priority to U.S. Provisional Application No. 63/283,618, filed Nov. 29, 2021, the entirety of which is incorporated herein by reference.

BACKGROUND

The present disclosure relates to the field of passive optical hardware and fiber-optic apparatuses. In particular, the technology of the disclosure relates to fiber-optic apparatuses for managing and connecting optical fibers.

Fiber-optic networks allow information to be transmitted via optical signals transmitted through optical fibers. Compared with traditional copper wiring, optical fibers allow transmission over greater distances with substantially less signal loss, provide a greater bandwidth, and do not suffer from electrical interference. Fiber-optic networks are particularly useful when providing long-distance communication and high bandwidth, so called "super-fast", broadband internet.

Typically, in a fiber-optic network a fiber optic cable is run from the network operator to a consumer premises (an outside plant, or OSP, cable). At the consumer premises, this cable is then split into a number of separate fiber-optic cables, each providing a network connection (inside plant, or ISP cables). Typically, this is done using a fiber-optic splitter, also known as an optical splitter or beam splitter. Exemplary beam splitters may divide a single input into 2, 4, 8, 16, or 32 output signals (or more), and are known as 1×2, 1×4, 1×8, 1×16 and 1×32 (etc.) splitters respectively. Two examples of optical splitter types are Fused Biconic Tapered (FBT) splitters and Planar Lightwave Circuit (PLC) splitters.

The outputs of the beam splitters are typically for supplying individual consumer premises. For example, in this manner, a fiber-optic broadband provider may lay a single fiber-optic cable to service a group of houses or businesses on a road or service a block of apartments. This cable may terminate in a street cabinet or wall terminal where the cable is split into a number of consumer fibers for servicing each individual house, business or apartment.

To provide flexibility, for example because the number of premises subscribed to the fiber-optic broadband provider may change, the output fibers of the beam splitter are usually connected to the consumer fibers via fiber-optic connectors or connector adaptors. Many standard connector types exist, such as SC, LC, and MPO connectors. These connections also occur within the street cabinet or wall terminal, and allow an engineer to quickly connect or disconnect individual consumer fibers within the fiber-optic network.

Individual consumer fibers can also be temporarily connected to each other by connectors, or permanently connected by splicing at a splice. Optical fibers are commonly spliced to fix accidentally broken fibers or join two fibers to create a fiber that is long enough for a required fiber run. Two common methods of splicing optical fibers are arc fusion splicing and mechanical splicing. Fusion splicing uses a fiber fusion splicer to align the ends of the fibers and then melt and fuse them together with an electric arc. Mechanical splicing is quicker and easier to carry out, but mechanical splices are typically less robust and have higher optical losses. Both methods generally involve installing a tubular enclosure that protects the splice.

Fiber-optic storage closures provide secure and cost-effective storage for optical fibers, splices, splitters, and other fiber-optic equipment. Such fiber closures also protect the optical fibers from becoming damaged. Typical fiber closures have a number of slots for housing and retaining splice storage trays (also known as cassettes). Fiber-optic splice storage trays provide a junction between incoming and outgoing optical fibers which have been spliced together. A fiber-optic splice storage tray typically has a portion for locating splices, and/or or other fiber-optic components and a portion for storing excess fiber from the incoming and outgoing fibers.

Such fiber-optic storage closures that exist in the art have a number of drawbacks. They are often large and not compact, while providing poor access for engineers needing to work on the fibers (e.g. to splice or connect fibers) within. Splicing in the field is where engineers spend a large portion of their time. With increasing demand for fiber-optic technology, space for the optical fibers and other associated components is at a premium. Existing fiber closures and trays are relatively large compared with the density of fiber housed therein due to the need to minimize tight bending angles. Additionally, multiple fiber-optic storage trays often have to be stacked to accommodate the required number of fiber-optic splices. In particular, in the case of high capacity splitters (1×32 or 2×32), a number of stacked trays are required within a closure to house all of the components required to manage the resulting optical fibers. The fibers then need to be routed in a complex manner between the trays. This can make access difficult for engineers needing to work on the fibers or the splices within, for maintenance purposes. However, each time the splices or fibers are accessed there is a risk that the engineer may mistakenly disturb or damage the contents, leading to a loss of connection of the affected fibers.

SUMMARY

The invention is defined in the independent claim, to which the reader is now directed. Preferred or advantageous features are set out in the dependent claims.

According to a first aspect, a fiber-optic apparatus is provided, the fiber-optic apparatus comprising a base, an optical splitter portion disposed on the base and configured to retain an optical splitter, a first fiber splicing portion, the first fiber splicing disposed on the base and configured to retain a plurality of optical fiber splices connecting to an optical splitter, and wherein the first fiber splicing portion is configured to retain a plurality of optical fiber splices such that an end of at least a first optical fiber splice is offset from an end of at least a second optical fiber splice in the direction of the depth of the apparatus.

This arrangement provides an apparatus with a smaller volume, without sacrificing optical fiber storage capacity and without hindering access to the optical fibers. In other words, this arrangement provides an apparatus with an increased optical fiber storage density capacity. In particular, the offset of an end of at least a first splice from an end of at least a second splice enables all of the components required to manage a high capacity splitter to be housed in a single fiber-optic apparatus or fiber-optic storage tray. More specifically, this arrangement allows a single apparatus or tray to house one or more high capacity splitters, the associated input and output splices to or from the high capacity splitter, along with the lengths of optical fiber associated with each splice. The fiber-optic apparatus or storage tray may be in the shape of a cuboid or may have any other suitable shape.

Optionally the first fiber splicing portion, and any of the other splicing portions described herein, is configured to retain a first layer or level of splices and a second layer or level of splices, with wherein the optical fiber splices in the second level or layer of optical fiber splices are retained directly above the optical fiber splices of the first level or layer of optical fiber splices. Each of the splices in the second level or layer may be located directly above a respective splice in the first level or layer.

Optionally, the fiber-optic apparatus is a tray or cassette.

Fiber-optic storage trays are well known and are commonly used in the field of fiber optic componentry. Advantageously, such trays offer a low cost, standardized solution to the problem of efficiently storing and managing optical fibers and their associated fiber optic components. Operators are familiar fiber-optic storage trays and how to access and work with optical fibers stored in such trays for installation or maintenance purposes.

Optionally, the base of the fiber-optic apparatus is flat.

The flat or substantially planar base of the apparatus may also be generally rectangular in shape. This may advantageously minimize the need for tight angles when managing the optical fibers stored therein. Many existing fiber optic trays have bases with chamfered edges which make them more compact but, in doing so, sacrifice some of their usable volume. The flat or substantially planar base of the apparatus or tray, without such chamfered edges, may also maximize the usable volume of the apparatus. This may enable larger optical fiber components to be located at the outer edges of the apparatus or tray. For example the optical splitter or stacked optical fiber splices may be located at the outer edges of the tray.

Optionally, the first fiber splicing portion is configured to retain a plurality of optical fiber splices such that at least a third optical fiber splice and at least the first optical fiber splice are offset with respect to one another in the direction of their length.

This arrangement advantageously increases the space available for optical splices on the first fiber splicing portion. In particular, the means for retaining the optical fiber splices on the fiber splicing portion can also be offset, thereby enabling adjacent optical fiber splices to be retained in closer proximity to each other. As a result of this, the density of fibers that can be retained on the first fiber splicing portion is increased. It should be noted that the first and third splices are merely exemplary splices and it should be understood that the tray is configured to retain a plurality of splices with such an offset.

Optionally, the first fiber splicing portion comprises a plurality of splice retaining members configured to retain the plurality of optical fiber splices.

These retaining members advantageously secure the fiber-optic splices and enable the apparatus to house and protect the fiber-optic splices. Furthermore, these retaining members also help to keep the splices and optical fibers within the apparatus organized and tidy, increasing splice and optical fiber density and reducing the likelihood of operator error when working on the splitter, the splices or the optical fibers.

Optionally, each respective optical fiber splice of the plurality of optical fiber splices is retained by a single respective splice retaining member of the plurality of splice retaining members.

In particular, each respective optical fiber splice of the plurality of optical fiber splices may be retained only by a single respective retaining member of the plurality of retaining members. This arrangement with only a single respective retaining member for retaining each respective optical fiber splice may be facilitated by the offset of an end of at least a first optical fiber splice from an end of at least a second optical fiber splice in the direction of the depth of the apparatus. This arrangement may also be facilitated by the offset at least a third optical fiber splice and at least the first optical fiber splice with respect to one another in the direction of their length. In particular, the offset of the optical fiber splices in the depth direction of the apparatus and/or the offset in the length direction of the splices may enable each splice to be retained by a respective retaining member at only one end of the splice. Adjacent splices may optionally be retained by respective retaining members at opposite ends of the splices. This may be advantageous for limiting the space occupied by the retaining members in the fiber splicing portion of the apparatus, thus maximizing the usable volume of the apparatus available for storing optical fiber components such as optical splitters and optical fiber splices.

Optionally, the plurality of splice retaining members are configured to retain the optical fiber splices in a parallel configuration with respect to one another.

Retaining the splices in a parallel configuration helps to keep the splices and optical fibers within the apparatus organized and tidy, providing easier access to the splices during routine maintenance work by an operator and reducing the likelihood of operator error when working on the splitter, the splices or the optical fibers. The parallel configuration of the splices may also optimize optical component and optical fiber density in the apparatus.

Optionally, the plurality of splice retaining members are arranged in the first fiber splicing portion in a first group of splice retaining members and a second group of splice retaining members.

This configuration may advantageously help to distribute the retaining members on the first fiber splicing portion. This can allow for more usable space which can be used to retain the optical fiber splices. This arrangement may be particularly beneficial in embodiments where the optical fiber splices are retained in a parallel configuration and each of the optical fiber splices are retained by a respective optical fiber splice of the plurality of optical fiber splices. The first group of retaining members and the second group of retaining members may be separated in the length direction of the optical fiber splices. This may advantageously maximize the usable space available for retaining optical fiber splices on the fiber splicing portion. The first group of retaining members may be configured to retain a first group of optical fiber splices and the second group of retaining members may be configured to retain a second group of optical fiber splices. The first group of retaining members may have an equal number of retaining members as the second group of retaining members. Alternatively, the first group of retaining members and the second group of retaining members may have a different number of retaining members. Optionally, each one of the retaining members of the first group of retaining members and the second group of retaining members may be spaced equally from one another. Alternatively, each one of the retaining members of the first group of retaining members and the second group of retaining members may have unequal spacing from one another.

Optionally, each splice retaining member of the first group of splice retaining members is configured to engage with a respective optical fiber splice at or near an end of said optical fiber splice closest to a first edge of the apparatus and each splice retaining member of the second group of splice retaining members is configured to engage with a respective optical fiber splice at or near an end of said optical fiber splice closest to a second edge of the apparatus.

The first edge and the second edge of the apparatus may be opposing edges of the apparatus. The first and second edges of the apparatus may be parallel edges of the apparatus. Advantageously, this arrangement may help to optimize splice and optical fiber density in the apparatus.

Optionally, at least some of the splice retaining members of the first group are configured to retain a plurality of optical fiber splices at a first height relative to the apparatus and at least some of the splice retaining members of the second group are configured to retain a plurality of splices at a second height relative to the apparatus, the second height being different to the first height.

The first height relative to the apparatus and the second height relative to the apparatus may be different. The first height relative to the apparatus may be greater than the second height relative to the apparatus. This arrangement may help to create the offset of an end of at least the first optical fiber splice from an end of at least the third optical fiber splice in the direction of the depth of the apparatus.

Optionally, the splice retaining members of the first group of splice retaining members and the splice retaining members of the second group of splice retaining members are each arranged in respective first and second rows of splice retaining members, wherein the second row of splice retaining members of the first group is configured to retain a plurality of optical fiber splices at the second height relative to the apparatus and the second row of splice retaining members of the second group is configured to retain a plurality of splices at the first height relative to the apparatus.

This arrangement of the splice retaining members of the first group of splice retaining members and the splice retaining members of the second group of splice retaining members are each arranged in respective first and second rows of splice retaining members may further help to organize the optical fiber splices on the first fiber splicing portion to maximize the density of fibers that can be retained thereon. The arrangement of retaining members in rows may space out the retaining members on the first fiber splicing portion. This can be particularly advantageous for facilitating the offset of the optical fiber splices of the first fiber splicing in the direction of the depth of the apparatus as well as in the direction of the length of the splices.

Optionally, the optical fiber splices retained at the first height relative to the base of the apparatus define a first level of optical fiber splices, and the optical fiber splices retained at the second height relative to the base of the apparatus define a second level of optical fiber splices.

This configuration of the optical fiber splices on a first level and a second level in the depth direction of the apparatus, advantageously maximizes the volume of the apparatus used for housing optical fiber splices and, therefore, maximizes the storage density of the apparatus.

Optionally, the optical fiber splices of the second level of optical fiber splices are retained directly above the optical fiber splices of the first level of optical fiber splices.

This configuration can help to further increase the density of optical fiber splices which can be retained on the first fiber splicing portion. This is because this arrangement maximizes the number or splices which can be retained within a given width of the first fiber splicing portion.

Optionally, the optical splitter portion comprises a first splitter retaining member configured to retain an optical splitter.

The first splitter retaining member advantageously secures the optical splitter and enables the apparatus to house and protect the optical splitter. Furthermore, this retaining member also helps to keep the splitter and optical fibers within the apparatus organized and tidy, increasing optical fiber density and reducing the likelihood of operator error when working on the splitter, the splices or the optical fibers.

Optionally, the optical splitter portion comprises a second splitter retaining member configured to retain an optical splitter.

The second splitter retaining member advantageously provides further security to the optical splitter and helps to better retain the optical splitter on the apparatus. This second retaining member also helps to keep the splitter and optical fibers within the apparatus organized and tidy, increasing optical fiber density and reducing the likelihood of operator error when working on the splitter, the splices or the optical fibers.

Optionally, the fiber-optic apparatus further comprises a fiber management portion disposed on the base.

The fiber management portion may be disposed adjacent the first fiber splicing portion. Placing the fiber management portion adjacent to the first fiber splicing portion means that the optical fibers and optical fiber splices can be easily adjusted if necessary —for example if a splice needs to be redone. The first fiber management portion may also manage optical fibers feeding into or coming out the one or more optical splitters. Such a fiber management portion has the advantage of enabling better storage of excess lengths of optical fiber.

Optionally, the fiber management portion is configured to retain coils of excess optical fiber.

Optionally, the fiber-optic apparatus further comprises a second fiber splicing portion configured to retain a plurality of optical fiber splices such that an end of at least a first optical fiber splice is offset from an end of at least a second optical fiber splice in the direction of the depth of the apparatus.

In such an arrangement, the fiber-optic storage apparatus may advantageously have double the available volume for storing optical fiber splices. The second fiber splicing portion may share all of the features of the first fiber splicing portion.

Optionally, the first fiber splicing portion is disposed on a first side of the fiber management portion and the second fiber splicing portion is disposed on a second side of the fiber management portion, the second side of the fiber management portion being opposite the first side of the fiber management portion.

It should be noted that a "side" of the tray refers to the position to the left or right of the apparatus when looking at the apparatus from a top view. This configuration with the first and second fiber splicing portions on either side of the fiber management portion provides easy access to the fiber management portion for the fibers coming from both the first and second optical fiber splicing portions.

Optionally, the first fiber splicing portion is separated from the fiber management portion by a first containment wall and the second fiber splicing portion is separated from the fiber management portion by a second containment wall.

The first and second containment walls of the fiber-optic apparatus each constitute a physical barrier between the fiber management portion and the first and second fiber splicing portions respectively. The containment wall may advantageously facilitate management and maintenance of the optical fibers associated with the splices retained on the first and second fiber splicing portions. In particular, the first and second containment walls may reduce the likelihood of operator error when working on the splitters, the splices or the optical fibers.

Optionally, the first fiber splicing portion and the second fiber splicing portion are each configured to retain 16 optical fiber splices.

Therefore, the apparatus may have the capacity to retain up to 32 optical fiber splices on the first and second fiber splicing portions.

However, a person skilled in the art will understand that the features and arrangements of the apparatus, disclosed herein by way of exemplary embodiments, can be applied to any number of optical fiber splices.

Optionally, the optical splitter portion is a first optical splitter portion, and the fiber-optic apparatus further comprises a second optical splitter portion. The first optical splitter portion may be disposed on the first side of the fiber management portion and the second optical splitter portion is disposed on the second side of the fiber management portion.

The second optical splitter portion may share all of the features of the first optical splitter portion. In such a configuration with two optical splitter portions, the fiber-optic apparatus is able to store two optical splitters. However, a person skilled in the art will understand that the features and arrangements of the apparatus, disclosed herein by way of exemplary embodiments, can be applied to any number of optical splitters. This configuration with the first and second optical splitter portions on either side of the fiber management portion provides easy access to the fiber management portion for the fibers coming from both the first and second optical splitter portions.

Optionally, the fiber-optic apparatus further comprises a third fiber splicing portion disposed on the base and configured to retain at least one optical fiber splice.

The third fiber splicing portion may advantageously provide storage for additional optical fiber splices. The third fiber splicing portion may provide storage for up to two additional optical fiber splices. The third fiber splicing portion may advantageously provide a dedicated space for storing optical fiber splices which feed into the one or more optical splitters.

Optionally, the third fiber splicing portion comprises one or more splice retaining members each configured to retain an optical fiber splice on the third fiber splicing portion.

Similarly to the retaining members of the first and second fiber splicing portions, the splice retaining members of the third and fourth fiber splicing portions advantageously secure the fiber-optic splices and enable the apparatus to house and protect the fiber-optic splices. Furthermore, these retaining members also help to keep the splices and optical fibers within the apparatus organized and tidy, increasing splice and optical fiber density and reducing the likelihood of operator error when working on the splitter, the splices or the optical fibers.

Optionally, the plurality of splice retaining members of the third fiber splicing portion are configured to retain at least one optical fiber splice in a first level of optical fiber splices and to retain at least one optical fiber splice in a second level of optical fiber splices, the, being at different heights relative to the base.

This arrangement may help to optimize the space taken by the optical fiber splices of the third fiber splicing potion and maximize the density of fiber that can be housed in the apparatus.

Optionally, the fiber-optic apparatus further comprises a fourth fiber splicing portion disposed on the base and configured to retain at least one optical fiber splice.

The fourth fiber splicing portion may advantageously provide storage for additional optical fiber splices. The third fiber splicing portion may provide storage for up to two additional optical fiber splices. The third fiber splicing portion may advantageously provide a dedicated space for storing optical fiber splices which feed into the one or more optical splitters.

Optionally, the first and second fiber splicing portions may be configured to retain output optical fiber splices coming from the one or more optical splitters. The third and fourth fiber splicing portions may advantageously retain input optical fiber splices feeding into the one or more optical splitters. The fiber-optic apparatus can achieve maximum high fiber density when the third and fourth fiber splicing portions each retain two optical fiber splices feeding into two 2×16 optical splitters, one retained on each of the first and second optical splitter portions. In this maximum density configuration, each of the two optical splitter portions feeds into 16 optical fiber splices retained on the first and second fiber splicing portions respectively. It is noted that the tray can also achieve a very high density of optical fibers with two 1×16 splitters, one 1×32 splitter or one 2×32 splitter. It will, however, be understood by a person skilled in the art that, although the first and second fiber splicing portions are preferably configured to retain optical fiber splices coming from the one or more splitters, and the third and fourth fiber splicing portions are preferably configured to retain optical fiber splices which input into the one or more optical splitters, the first, second, third and fourth fiber splicing portions may retain any combination of splitter input or output splices. It should be noted that the absence of a second fiber splicing portion does not preclude the presence of a third and/or fourth fiber splicing portion. The denominations "first", "second", "third" and "fourth" are merely used in relation to the fiber splicing portions to differentiate between the different fiber splicing portions.

Optionally, third fiber splicing portion is disposed on the first side of the fiber management portion and the fourth fiber splicing portion is disposed on the second side of the fiber management portion.

This configuration with the third and fourth fiber splicing portions on either side of the fiber management portion provides easy access to the fiber management portion for the fibers coming from both the third and fourth optical fiber splicing portions.

Optionally, the fiber management portion is a first fiber management portion and the fiber-optic apparatus further comprises a second fiber management portion disposed on the base.

This arrangement may help to better organize the lengths of optical fiber from the optical fiber splices and separate the optical fibers originating from different components of the apparatus. This can advantageously provide a more organized and tidy arrangement which reduces the likelihood of operator error when working on the optical fibers. More specifically, this arrangement an operator may work on optical fibers in one fiber management portion without disturbing optical fibers in the other fiber management portion. The second fiber management portion may be configured to retain coils of excess optical fiber in a figure of eight configuration. This figure of eight configuration may allow input and output optical fibers to both be routed through the second fiber management portion.

Optionally, the second fiber management portion is circumscribed by the first fiber management portion.

Optionally, the fiber-optic apparatus further comprises a third fiber management portion disposed on the base.

Advantageously, the third fiber management portion may, in combination with the first and second fiber management portions, help to better organize the lengths of optical fiber from the optical fiber splices and separate the optical fibers originating from different components of the apparatus. This can advantageously provide a more organized and tidy arrangement which reduces the likelihood of operator error when working on the optical fibers. The fiber management portions may provide storage space for up to 1 meter of optical fiber on each side of a splice. In more detail, in an example configuration in which the apparatus comprises a first, second, third and fourth fiber splicing portion as described above, the fiber management portion may provide sufficient storage space for up to 36 meters of optical fiber (1 meter per splice with 16 splices on each of the first and second fiber splicing portions and two splices on each of the third and fourth fiber splicing portions).

Optionally, the third fiber management portion circumscribes the first and second fiber management portions.

Optionally, the fiber-optic apparatus further comprises an outer wall extending from the base and at least partially around an outer perimeter of the base.

The outer wall may define the height of the fiber-optic apparatus. The height of the fiber-optic apparatus may be such that an optical splitter can be retained on each of the first and/or second optical splitter portions. The height of the fiber-optic apparatus may also be chosen such that optical fiber splices can be retained in two or more levels of optical fiber splices.

Optionally, the outer wall defines a first fiber input or output region and a second fiber input or output region.

Configurations in which the fiber input region and the fiber output region are discrete may provide a more organized and tidy arrangement which reduces the likelihood of operator error when working on the splitter, the splices or the optical fibers.

Optionally, the fiber-optic apparatus is symmetric along a line extending through the centre of the base.

Optionally, the fiber-optic apparatus further comprises one or more portions for holding fiber-optic components other than optical fiber splices or optical splitters.

Optionally, the one or more portions for holding fiber-optic components other than optical fibers or optical splitters includes one or more wavelength division multiplexer (WDM) portions for holding WDM components.

It should be noted that the fiber-optic apparatus is configured to retain all of the components described above on one surface of the apparatus. In other words, where the fiber-optic apparatus comprises a first and a second optical splitter portion, a first, second, third and fourth fiber splicing portion, and a first, second and third fiber management portion, these are all disposed on the same surface of the apparatus.

According to a second aspect, fiber optic equipment housing such as a fiber housing box, break-out box, fiber closure or splice closure is provided and includes one or more apparatuses or trays as described in relation to the first aspect.

The first aspect may be implemented with any of the features of the third aspect.

Additional features and advantages will be set forth in the detailed description which follows, and in part will be readily apparent to those skilled in the art from that description or recognized by practicing the invention as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

DETAILED DESCRIPTION OF THE INVENTION

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to like components or parts.

Embodiments described in relation to the figures relate to a fiber-optic storage tray, being a tray that includes one or more splice storage portions, and one or more optical splitter portions. However, it should be noted that any aspects of these embodiments could be implemented as an alternative tray type such as a WDM tray that also includes one or more splice storage portions. That is, a fiber-optic storage tray as described herein may also include portions for holding or storing other fiber-optic components such as WDM components, including but not limited to, multiplexers or demultiplexers. In addition, it should be noted that the fiber-optic splicing portion or optical splitter portion described herein may be implemented in fiber-optic equipment without being located on a tray at all. For example, one or more splice portions or one or more splitter portions may be mounted or positioned on or within a housing of fiber-optic equipment such as within a fiber optic cabinet or other fiber or cable management apparatus.

Figure 1:
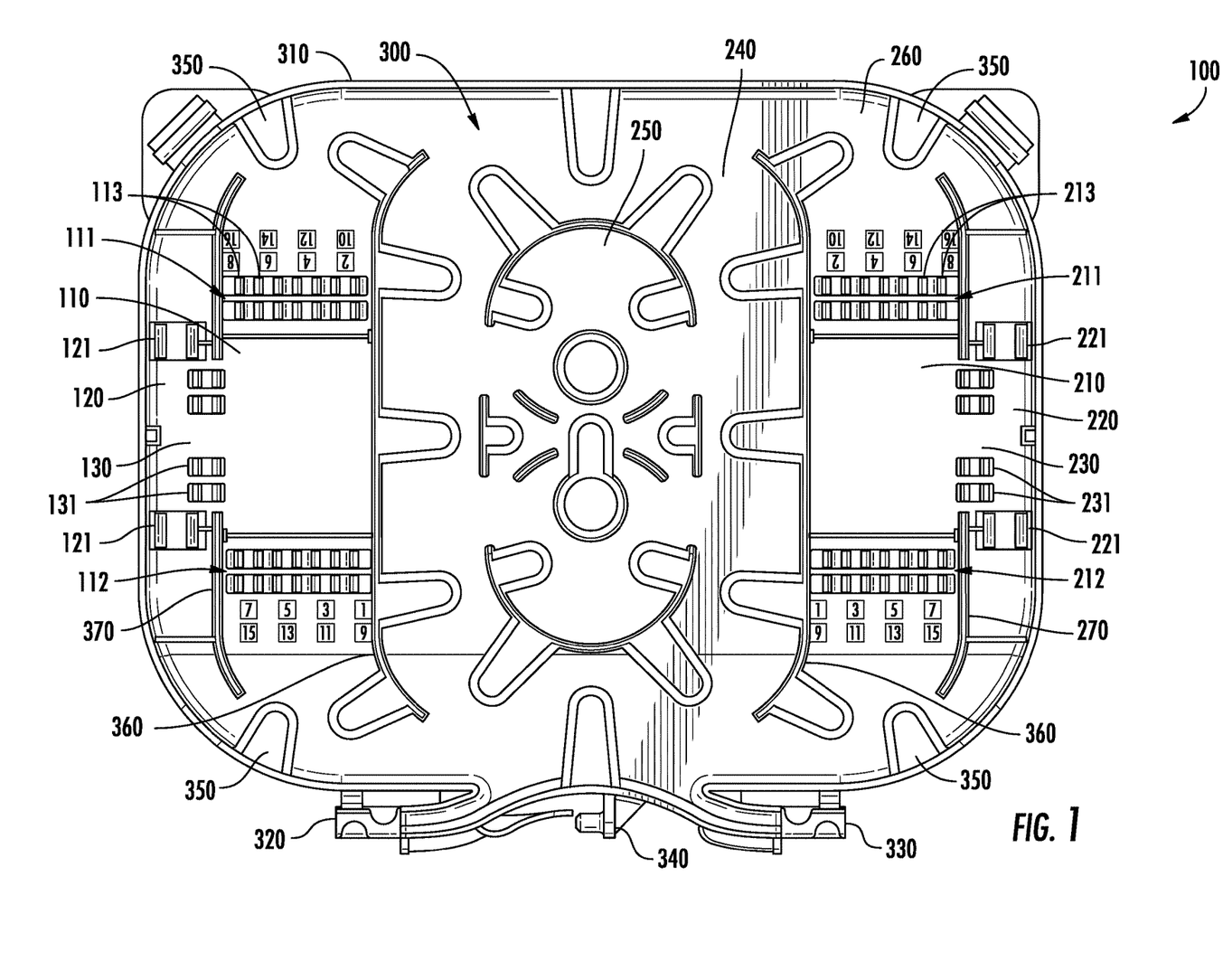
FIG. 1 illustrates a top view of an exemplary fiber-optic apparatus according to an embodiment.

FIG. 1 illustrates a top view of an exemplary fiber-optic tray 100 according to an embodiment.

As illustrated, the tray 100 comprises a first fiber splicing portion 110, a second fiber splicing portion 210, a third fiber splicing portion 130, a fourth fiber splicing portion 230, a first optical splitter portion 120, a second optical splitter portion 220, a first fiber management portion 240, a second fiber management portion 250 and a third fiber management portion 260. The first fiber splicing portion 110, the third fiber splicing portion 130, and the first optical splitter portion 120 are disposed on a first side of the tray 100, and the second fiber splicing portion 210, the fourth fiber splicing portion 230 and the first optical splitter portion 220 are disposed on a second side of the tray 100. The first and second sides of the tray are disposed on either side of the first fiber management portion 240 and the second fiber management portion 250. The first fiber management portion 240 circumscribes the second fiber management portion 250. The third fiber management portion circumscribes the first fiber splicing portion 110, the second fiber splicing portion 210, the third fiber splicing portion 130, the fourth fiber splicing portion 230, the first optical splitter portion 120, the second optical splitter portion 220, the first fiber management portion 240 and the second fiber management portion 250. The third fiber management portion may optionally be located around the inside edge of the tray.

The first fiber splicing portion 110 and the first fiber management portion 240 may be separated by a containment wall 360. The second fiber splicing portion 210 may be separated from the first fiber management portion 240 by a containment wall 360. These containment walls 360 may physically separate the splices retained on the first fiber splicing portion 110 and the second fiber splicing portion 210 from the fibers stored in the first fiber management portion 240. The first optical splitter portion 120 and the third fiber splicing portion 130 may be separated from the first fiber splicing portion 110 by a containment wall 370. The second optical splitter portion 220 and the fourth fiber splicing portion 230 may be separated from the second fiber splicing portion 210 by a containment wall 370. These containment walls 370 may physically separate the splices and splitters retained by the first and second optical splitter portions 120, 220, and the third and fourth fiber splicing portions 130, 230, from the splices retained by the first and second fiber splicing portions 110, 210. The configuration whereby the tray 100 has fiber splicing portions 110, 130 on a first side of the tray and fiber splicing portions 210, 230 on a second side of the tray 100 and separated by the first fiber management portion 240 may help to avoid mixing of optical fibers on the first side of the tray 100 and the second side of the tray 100. In alternative examples, the tray 100 may only have one, two, three or more than four fiber splicing portions. The tray 100 may also have only one or more than two optical splitter portions. The tray 100 may also have only one, two or more than three fiber management portions. The present disclosure contemplates that the tray 100 may have any number and combination of fiber splicing portions, optical splitter portions and fiber management portions, depending on the requirements of a particular use case. It is also noted that the tray 100 may have any number of containment walls to separate fiber splicing portions, optical splitter portions and fiber management portions. However, it has been found that the illustrated tray 100 with four fiber splicing portions 110, 210, 130, 230, two optical splitter portions 120, 220 and three fiber management portions 240, 250, 260 is advantageous in its compactness and ability to fulfill a broad range of use requirements. The tray 100 illustrated is symmetric about a line extending through the centre of the tray 100 and separating the first and second side of the tray 100. However, it is contemplated that the tray 100 may not be symmetric.

The fiber splicing portions 110, 210, 130, 230 are configured to retain and/or secure an optical fiber splice. The fiber splicing portions 110, 210, 130, 230 may be configured to retain and/or secure a specific type or types of splice, or may be configured to retain and/or secure any type of splice. For example, the fiber splicing portions 110, 210, 130, 230 may be configured to retain and/or secure a mechanical splice and/or a fusion splice, either of which may or may not be in a protective casing to protect the splice. The fiber splicing portions 110, 210, 130, 230 may be configured to retain and/or secure a single optical fiber splice, or multiple optical fiber splices. The fiber splicing portions 110, 210, 130, 230 may be configured to retain and/or secure the same number of optical fiber splices or different numbers of optical fiber splices.

The first, second, third and fourth fiber splicing portions 110, 210, 130, 230 each comprise a respective splice retaining member 113, 213, 131, 231 configured to retain an optical fiber splice. The first, second, third and fourth fiber splicing portions 110, 210, 130, 230, may each comprise a single splice retaining member 113, 213, 131, 231 or multiple splice retaining members 113, 213, 131, 231. A splice retaining member may be clip, a clasp, a fastener, a latching mechanism or any other suitable retention means. In examples with multiple splice retaining members, the splice retaining members 113, 213, 131, 231 may all be of the same type or may be any combination of clips, clasps, fasteners, latching mechanisms or any other suitable retention means. In the illustrated example, the first, second, third and fourth fiber splicing portions 110, 210, 130, 230 comprise splice retaining members 113, 213, 131, 231 in the form of a plurality of clips. The first, second, third and fourth fiber splicing portions 110, 210, 130, 230 may have the same number of splice retaining members 113, 213, 131, 231 or a different number of splice retaining members. A single splice retaining member 113, 213, 131, 231 of the first, second, third and fourth fiber splicing portions 110, 210, 130, 230 may retain a single optical fiber splice. Alternatively, a single splice retaining member 113, 213, 131, 231 may retain multiple optical fiber splices or multiple splice retaining members 113, 213, 131, 231 may retain a single optical fiber splice. As illustrated, the first, second, third and fourth fiber splicing portions 110, 210, 130, 230 have multiple splice retaining members 113, 213, 131, 231. In the example of FIG. 1, the first and second fiber splicing portions 110, 210 have the same number of splice retaining members 113, 213 and are configured to retain 16 optical fiber splices. In this example, the third and fourth fiber splicing portions 130, 230 also share the same number of splice retaining members 131, 231 and are configured to retain the same number of optical fiber splices. Each of the third and fourth fiber splicing portions 130, 230 have four splice retaining members 131, 231 and are configured to retain two optical fiber splices. Two splice retaining members 131, 231 are located on the half of the tray 100 proximate the top wall of the tray 100 and two splice retaining members 131, 213 are located on the half of the tray 100 proximate the bottom wall of the tray 100.

In examples in which the first and second fiber splicing portions 110, 210 have multiple splice retaining members 113, 213, the retaining members 113, 213 may be arranged in a first group of splice retaining members 111, 211 and a second group of splice retaining members 112, 212. The first group of retaining members 111, 211 and a second group of splice retaining members 112, 212 may have two or more splice retaining members 113, 213. The first group of splice retaining members 111, 211, and a second group of splice retaining members 112, 212 may have the same or a different number of splice retaining members. The first group of splice retaining members 111, 211, and a second group of splice retaining members 112, 212 may be defined by the relative position of the splice retaining members. For example, the retaining members of the first group of retaining members 111, 211, and the retaining members of the second group of retaining members 112, 212, may be spaced proximate to one another and interleaved with one another or may be defined by their position relative to other components or features of the tray 100. In the illustrated example, the first group of splice retaining members 111, 211, are located proximate the top wall of the tray 100 and the second group of splice retaining members 112, 212 are located proximate the bottom wall of the tray 100.

In the tray illustrated in FIG. 1, the first group of splice retaining members 111, 211 and the second group of splice retaining members 112, 212 are each arranged in two rows of splice retaining members 113, 213. However, it will be appreciated that the first group of splice retaining members 111, 211 and the second group of splice retaining members 112, 212 may be arranged in a single row of splice retaining members, more than two rows of splice retaining members or any other suitable configuration.

The optical splitter portions 120, 220 are configured to retain and/or secure an optical splitter. The optical splitter portions 120, 220 may be configured to retain and/or secure a specific type or types of optical splitter, or may be configured to retain and/or secure any type of optical splitter. For example, the optical splitter portions 120, 220 may be configured to retain and/or secure a FBT or a PLC splitter. The optical splitter portions 120, 220 may be configured to retain and/or secure a 1×2, 1×4, 2×4, 1×8, 2×8, 1×16, 2×16, 1×32 and 2×32 splitter. The optical splitter portions 120, 220 may be configured to retain and/or secure a single optical splitter, or multiple optical splitters. The optical splitter portions 120, 220 may be configured to retain and/or secure the same number of optical splitters or a different number of optical splitters.

The optical splitter portions 120, 220 may have one or more splitter retaining members 121, 221 configured to retain an optical splitter. A splitter retaining member may be clip, a clasp, a fastener, a latching mechanism or any other suitable retention means. In examples with multiple splitter retaining members, the splitter retaining members 121, 221 may all be of the same type or may be any combination of clips, clasps, fasteners, latching mechanisms or any other suitable retention means. In the illustrated example, the first and second optical splitter portions 120, 220 comprise splitter retaining members 121, 221 in the form of a plurality of clips. In the illustrated example, each optical splitter portion 120, 220 comprises two splitter retaining members 121, 221. However, the optical splitter portions 120, 220 may comprise any number of splitter retaining members 121, 221

The retaining members 113, 213, 121, 221, 131, 231 illustrated are arranged such that they retain optical fiber splices and optical splitters in a parallel configuration. However, it will be appreciated that the retaining members 113, 213, 121, 221, 131, 231 may be configured to retain optical fiber splices and/or optical splitters in any other non-parallel configuration.

The features of the first, second, third and fourth fiber splicing portions 110, 210, 130, 230 and the optical splitter portions 120, 220, in particular, the retaining members 113, 213, 121, 221, 131, 231 will be discussed in more detail below in respect of FIG. 3.

In the example of FIG. 1, the tray 100 has a fiber routing portion 350 disposed adjacent the fiber splicing portion 110, 210. The fiber routing portion 350 is configured to guide, secure and/or retain optical fibers. The fiber routing portion 350 is configured to guide the optical fibers to or from the first and second fiber management portions 240 and 250 to or from the first, second, third and fourth fiber splicing portions 110, 210, 130, 230 and the first and second optical splitter portions without excessive bending. The fiber routing portion 350 is also configured to retain optical fibers from the third fiber management portion 260. The tray 100 may have one or more fiber routing portions 350. In this example, the tray 100 has four fiber routing portions 350.

Fiber management portions 240, 250, 260 can be used to store excess lengths of fiber. For example, many optical fiber splices have an attached length of optical fiber at each end of the splice. This length is often more than required, and so excess length can be coiled in a fiber management portion 240, 250, 260. The fiber management portions 240, 250, 260 are sized so as to avoid excessive bending of the fibers. The tray 100 may have any number of fiber management portions 240, 250, 260 depending upon the use requirements. In the example illustrated in FIG. 1, the tray 100 has three fiber management portions 240, 250, 260. The first fiber management portion 240 circumscribes the second fiber management portion 250 and both the first and second fiber management portions 240, 250 are circumscribed by the third fiber management portion 260. This has been found to be advantageous because it provides sufficient space to store the optical fiber from all of the fiber splicing portions 110, 210, 130, 230 and the optical splitter portions 120, 220. It is also advantageous to have the fiber management portions 240, 250, 260 located nearby or adjacent to the fiber splicing portions 110, 210, 130, 230 and the optical splitter portions 120, 220 because it means that if, for example, a splice needs to be redone then the excess fiber is easily accessible and the new splice can be made without having to reroute large portions of fiber. The arrangement whereby the tray has three fiber management portions 240, 250, 260 is also advantageous in that an operator can work on fibers retained in one fiber management portion without disturbing fibers retained in another fiber management portion.

The tray 100 has a base 300 with an outer wall 310 extending from the base 300 and at least partially around the perimeter of the base 300. The tray may be generally planar or may have any other suitable shape. The outer wall 310 may define a top wall, a bottom wall, and first and second opposed side walls of the tray. The outer wall 310 helps to retain one or more optical fibers, and optical fiber splices within the tray 100. The outer wall 310 may also help to protect the contents against ingress of moisture, dust, or other debris.

In the bottom wall of the tray 100, at least two openings are provided for the one or more optical fibers or one or more groups of optical fibers to pass to the interior of the tray 100 from the exterior of the tray 100 or vice versa. In this example, a first fiber input/output region 320 defines a first opening and a second fiber input/output region 330 defines a second opening in the outer wall 310 of the tray 100. The first fiber input/output region 320 and the second fiber input/output region 330 may allow one or more input optical fibers or groups of optical fibers to pass from the exterior into the interior of the tray 100 or from the interior to the exterior of the tray 100. The second fiber input/output region 330 may allow one or more output optical fibers or groups of optical fibers to pass from the interior to the exterior of the tray 100. It is noted that while these openings of the first fiber input/output region 320 and the second fiber input/output region 330 are in the bottom wall of the tray 100 in this example, they could also be located in different locations, such as in the top wall, the first or second side wall, or even the base 300 of the tray 100, and need not be located in the same wall or side. It should be noted that the first fiber input/output region 320 may also act as both an input and an output simultaneously. Similarly, the second fiber input/output region 330 may also act as an input or an output simultaneously.

The openings of the first fiber input/output region 320 and the second fiber input/output region 330 may have just one aperture for a single fiber, or may have a number of different apertures for numerous fibers. The size of the apertures may be dependent upon the fibers that are to pass through the opening. For example, an opening of the first fiber input/output region 320 or the second fiber input/output region 330 that is intended to a group of fibers may have a single large aperture. An opening of the first fiber input/output region 320 or the second fiber input/output region 330 configured to accommodate a plurality of single fibers may have numerous smaller apertures. In some examples, the openings of the first fiber input/output region 320 and the second fiber input/output region 330 may provide a single large aperture, and inserts can be inserted into the large aperture to provide the appropriate number and sizes of sub-apertures for the required application.

The tray 100 also has a hinge 340 which allows the tray 100 to be movably retained in fiber housing box, break-out box, fiber closure or splice closure. In alternative examples, other suitable retention means are envisaged.

Figure 2:
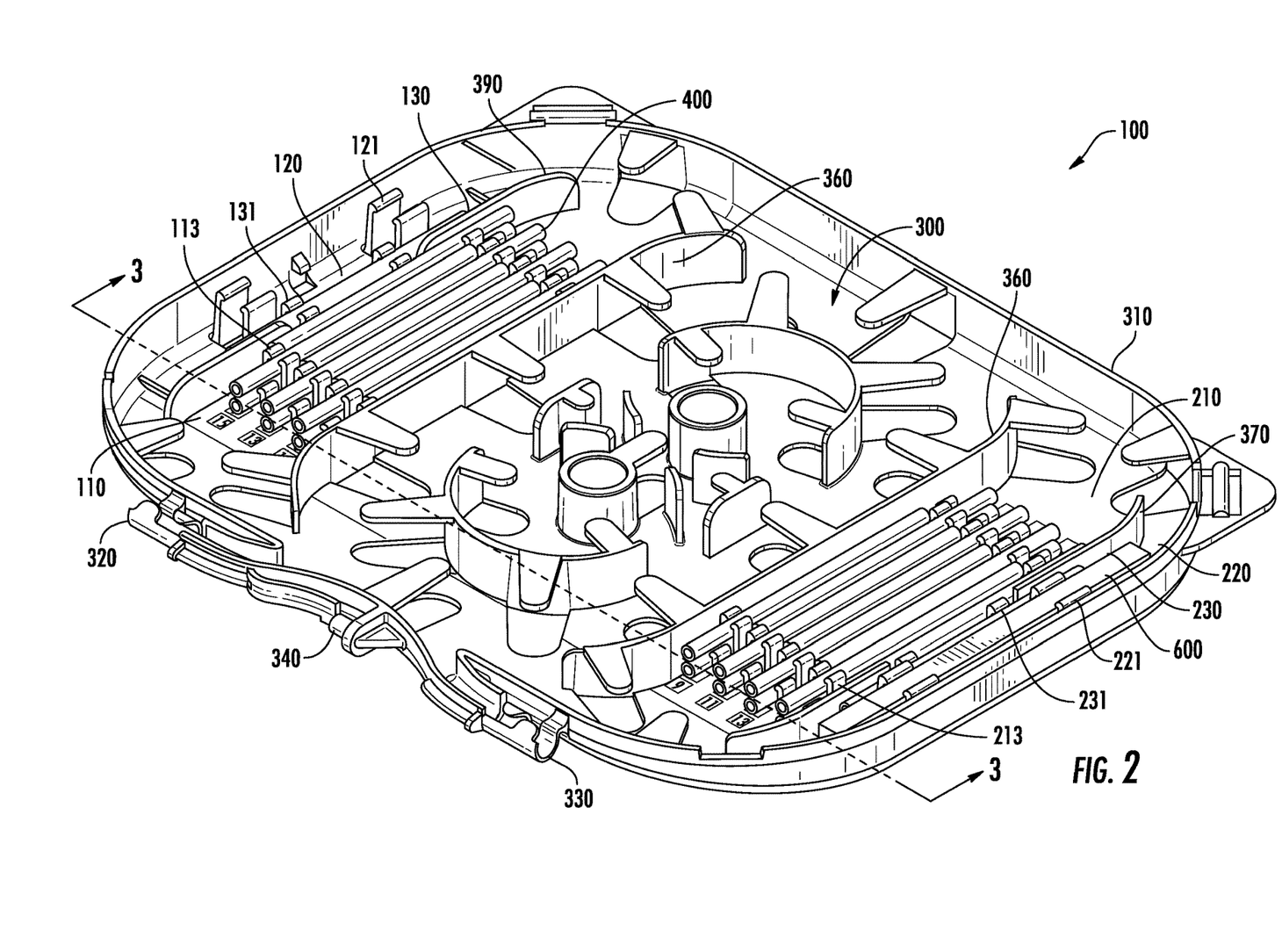
FIG. 2 illustrates a perspective view of an exemplary fiber-optic apparatus according to an embodiment, and including an optical splitter and 36 optical fiber splices retained thereon.

FIG. 2 illustrates a perspective view of an exemplary fiber-optic tray 100 according to an example, and including an optical splitter 600 and 36 optical fiber splices 410, 420 retained thereon. This view shows the outer wall 310 of the tray 100. The first fiber input/output region 320 and the second fiber input/output region 330 are also clearly shown which may allow one or more output optical fibers or groups of optical fibers to pass from the exterior to the interior of the tray or from the interior to the exterior of the tray 100.

For brevity, only features of the tray 100 revealed by this view which have not been mentioned previously will be discussed. However, it should be noted that the features of the tray 100 discussed above in respect of FIG. 1 also apply to the tray of FIG. 2.

FIG. 2 shows that the splice retaining members 113, 213, 131, 231 of this example are clips which have resilient arms that extend away from the base 300 of the tray 100. The arms of the clips are attached at one end to the base 300 of the tray 100 and at the opposing free end have an overhanging portion configured to engage with the optical fiber splices 400. The clips are generally formed of two resilient anus that are spaced apart by a distance slightly larger than the width of an optical fiber splice 400 to restrict or prevent lateral movement of a splice 400 retained therein. The resilient arms are configured to deflect laterally to allow a splice 400 to be inserted. The arms then return to their original position and an overhanging portion at the free end of the arms engages with the splices 400 to retain then in the retaining member. The clips may only have one arm if the clip is adjacent to a containment wall 360, 370 of the tray 100. This is because the containment wall 360, 370 may act as a second arm of clip. It is noted that in alternative examples, each clip may only have one arm associated with each optical fiber splice. It is also noted, once again that a splice retaining member 113, 213, 131, 231 may be clip, a clasp, a fastener, a latching mechanism or any other suitable retention means.

The optical fiber splices 400 shown retained on the first and second fiber splicing portions 110, 210 in this example, can be seen arranged in a double offset configuration. In particular, an end of at least a first optical fiber splice 400 is offset from an end of at least a second optical fiber splice 400 in the direction of the depth of the tray 100. More specifically, in the illustrated example, the optical fiber splices 400 are arranged in two levels of optical fiber splices, where the optical fiber splices of the second level are directly above the optical fiber splices of the first level. The splices 400 may also be configured in a single level of splices or in more than two levels of splices. It will be appreciated that any offset of an end of at least a first optical fiber splice 400 from an end of at least a second optical fiber splice 400 in the direction of the depth of the tray 100 may be envisaged. In the example of FIG. 2, the two levels of splices are parallel to the plane of the base 300 of the tray 100. However, the level or levels of splices 400 may not be parallel to the plane of the base 300 of the tray 100. It is noted that an end of each respective optical fiber splice 400 may be higher than the other end of the optical fiber splice 400. As shown, the splices 400 are also offset in the direction of the length of the splices 400. In particular adjacent splices 400 are offset in the direction of the length of the splices 400 with respect to each other. It will be appreciated that in other examples, the splices 400 may not be offset in the direction of their length. In this example, the first and second fiber splicing portions 110, 210 are configured to retain 16 optical fiber splices 400 each. It should be noted that the first and second fiber splicing portions 110, 210 may be configured to retain any number of optical fiber splices. In FIG. 2, the first and second fiber splicing portions 110, 210 are shown retaining the maximum number of optical fiber splices 400 for the tray of this example, i.e. 16 optical fiber splices 400 each. It should, however, be noted that the first and second fiber splicing portions 110, 210 may retain fewer than 16 optical fiber splices 400 thereon. Alternatively, no splices may be retained thereon.

In this example, the optical fiber splices 400 shown retained on the third and fourth fiber splicing portions 130, 230 are arranged in a stacked configuration. In particular, a second splice 400 is retained directly on top of a first splice 400. In alternative examples three or more optical fiber splices may be stacked on top of one another. Alternatively, the splices 400 may not be retained directly on top of one another. In this example, the splices 400 are aligned in the direction of their length. However, in alternative examples, the splices 400 may be offset in the direction of their length. In this example, the third and fourth fiber splicing portions 130, 230 are configured to retain two optical fiber splices 400 each. It should be noted that the third and fourth fiber splicing portions 130, 230 may be configured to retain any number of optical fiber splices 400. In FIG. 2, the third and fourth fiber splicing portions 130, 230 are shown retaining the maximum number of optical fiber splices 400 for the tray of this example, i.e. two optical fiber splices 400 each. It should, however, be noted that the third and fourth fiber splicing portions 130, 230 may only retain one optical fiber splice 400 thereon. Alternatively no splices may be retained thereon.

In this example, the first and second optical splitter portions 120, 220 are each configured to retain one optical splitter 600. Alternatively, the first and second optical splitter portions 120, 220 may be configured to retain two or more optical splitters 600. In the illustrated example, each optical splitter portion 120, 220 comprises two splitter retaining members 121, 221. Each optical splitter 600 is retained by two splitter retaining members 121, 221. In the illustrated example, the second optical splitter portion 220 is retaining an optical splitter 600 and the first optical splitter portion 120 is not. It should be noted that alternative examples are envisaged in which only the first optical splitter portion 120 retains an optical splitter 600 or in which each of the first and second optical splitter portions 120, 220 retain an optical splitter 600. Alternatively, neither the first nor second optical splitter portions 120, 220 may retain an optical splitter.

It will be understood by a person skilled in the art that, for simplicity, the optical fibers attached to the splices and splitters are not shown in the example of FIG. 2.

Figure 3:
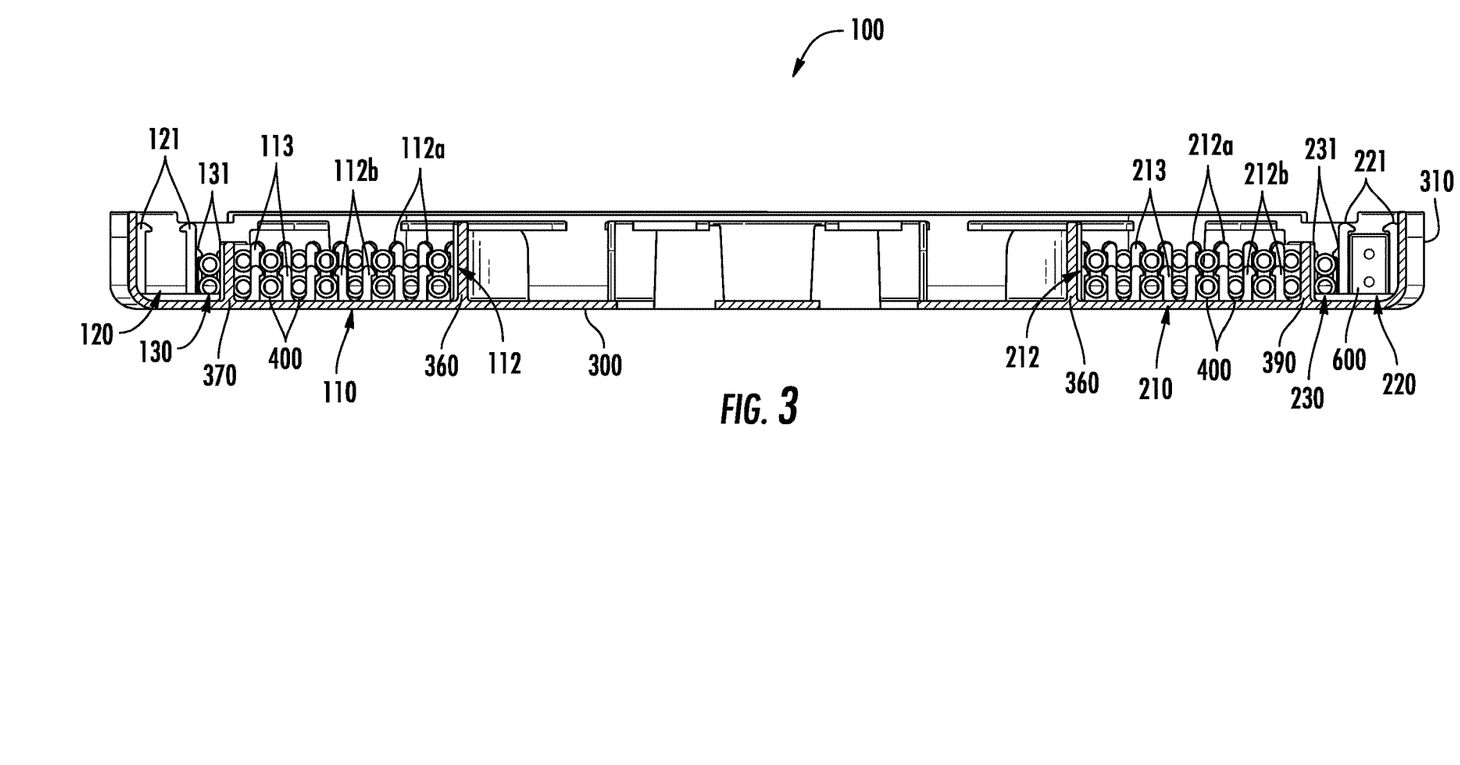
FIG. 3 illustrates a sectional view along line 3-3 of an exemplary fiber-optic apparatus according to an embodiment, and including an optical splitter and 36 optical fiber splices retained thereon.

FIG. 3 illustrates a sectional view along line 3-3 of an exemplary fiber-optic tray 100 according to an example, and including an optical splitter 600 and 36 optical fiber splices 400 retained thereon.

FIG. 3 shows an example in which the base 300 of the tray 100 is flat. In such an example, the depth of the tray 100 is substantially constant along the entire length or width of the tray 100. Alternative examples are envisaged in which the base 300 of the tray 100 is curved, chamfered, or stepped. In such alternative examples, the depth of the tray 100 may be different at different locations along the length or width of the tray 100.

FIG. 3 shows that the height of the splice retaining members 113, 213 of the two rows 112a, 212a, 112b, 212b of splice retaining members of the second group of retaining members 112, 212 are different. In particular the height of the splice retaining members 113, 213 of the first row 112a, 212a is greater than the height of the splice retaining members 113, 213 of the second row 112b, 212b. Alternatively, the height of the splice retaining members 113, 213 of the second row 112b, 212b may be greater than the height of the splice retaining members 113, 213 of the first row 112a, 212a. Alternatively, the splice retaining members 113, 213 of the first and second rows 112a, 212a, 112b, 212b of splice retaining members 113, 213 of the second group of splice retaining members 112, 212 may have the same height.

In the illustrated example, the optical fiber splices 400 can be seen stacked directly one on top of the other. This is facilitated by the vertical alignment of the splice retaining members of the first and second rows of splice retaining members 113, 213.

Although the splice retaining members 113, 213 of the first group of splice retaining members 111, 211 are not shown, it will be appreciated that the features of the second group of splice retaining members 112, 212 also apply to the first group.

FIG. 3 also shows that the height of the splice retaining members 131, 231 of the third and fourth fiber splicing portions 130, 230 are different. In particular, the two splice retaining members 131, 231 of each of the third and fourth fiber splicing portions 130, 230 located on the half of the tray 100 proximate the top wall of the tray 100 have different heights from one another and the two splice retaining members 131, 231 of each of the third and fourth fiber splicing portions 130, 230 located on the half of the tray 100 proximate the bottom wall of the tray 100 also have different heights from one another. The heights of the two splice retaining members 131, 231 of each of the third and fourth fiber splicing portions 130, 230 located on the half of the tray 100 proximate the top wall of the tray 100 may correspond with the heights of the splice retaining members of each of the third and fourth fiber splicing portions 130, 230 located on the half of the tray 100 proximate the bottom wall of the tray 100. In such a configuration the splices 400 may be retained parallel to the plane of the base 300 of the tray 100. Alternative examples are envisaged in which the heights of the two splice retaining members 131, 231 of each of the third and fourth fiber splicing portions 130, 230 located on the half of the tray 100 proximate the top wall of the tray 100 do not correspond with the heights of the splice retaining members of each of the third and fourth fiber splicing portions 130, 230 located on the half of the tray 100 proximate the bottom wall of the tray 100. In such examples, the splices 400 may not be retained parallel to the plane of the base 300 of the tray 100. Only the two splice retaining members 131, 231 of each of the third and fourth fiber splicing portions 130, 230 located on the half of the tray 100 proximate the bottom wall of the tray 100 can be seen in FIG. 3. However, it can be seen that these two splice retaining members of each of the third and fourth fiber splicing portions 130, 230 are configured to retain the two optical fiber splices in a stacked configuration. Alternatively, all of the splice retaining members 131, 231 of the third and fourth fiber splicing portions 130, 230 may have the same height. In such a configuration, the splices 400 of the third and fourth fiber splicing portions 130, 230 may not be stacked.

In the illustrated example, the optical fiber splices 400 can be seen stacked directly one on top of the other. This is facilitated by the vertical alignment of the two splice retaining members 131, 231 of located in the half of the tray proximate the top wall of the tray 100 and the vertical alignment of the two splice retaining members 131, 231 of located in the half of the tray proximate the top wall of the tray 100.

In the example of FIG. 3, a splitter 600 can be seen retained on the second optical splitter portion 220 by the splitter retaining member 221. There is no splitter retained on the first optical splitter portion 120 by the splitter retaining member 121.

In the example of FIG. 3, the tray 100 has a height of 10 millimeters. The height of the tray 100 may be defined by the height of the outer wall 310. In this example the height of the tray 100 is such that a splitter 600 can be retained on each of the first and second optical splitter portions 120, 220 and two levels of splices 400 can be retained on each of the first, second, third and fourth fiber splicing portions 110, 210, 130, 230. The tray 100 may have any height suitable for the requirements of a particular use case.

Figure 4:
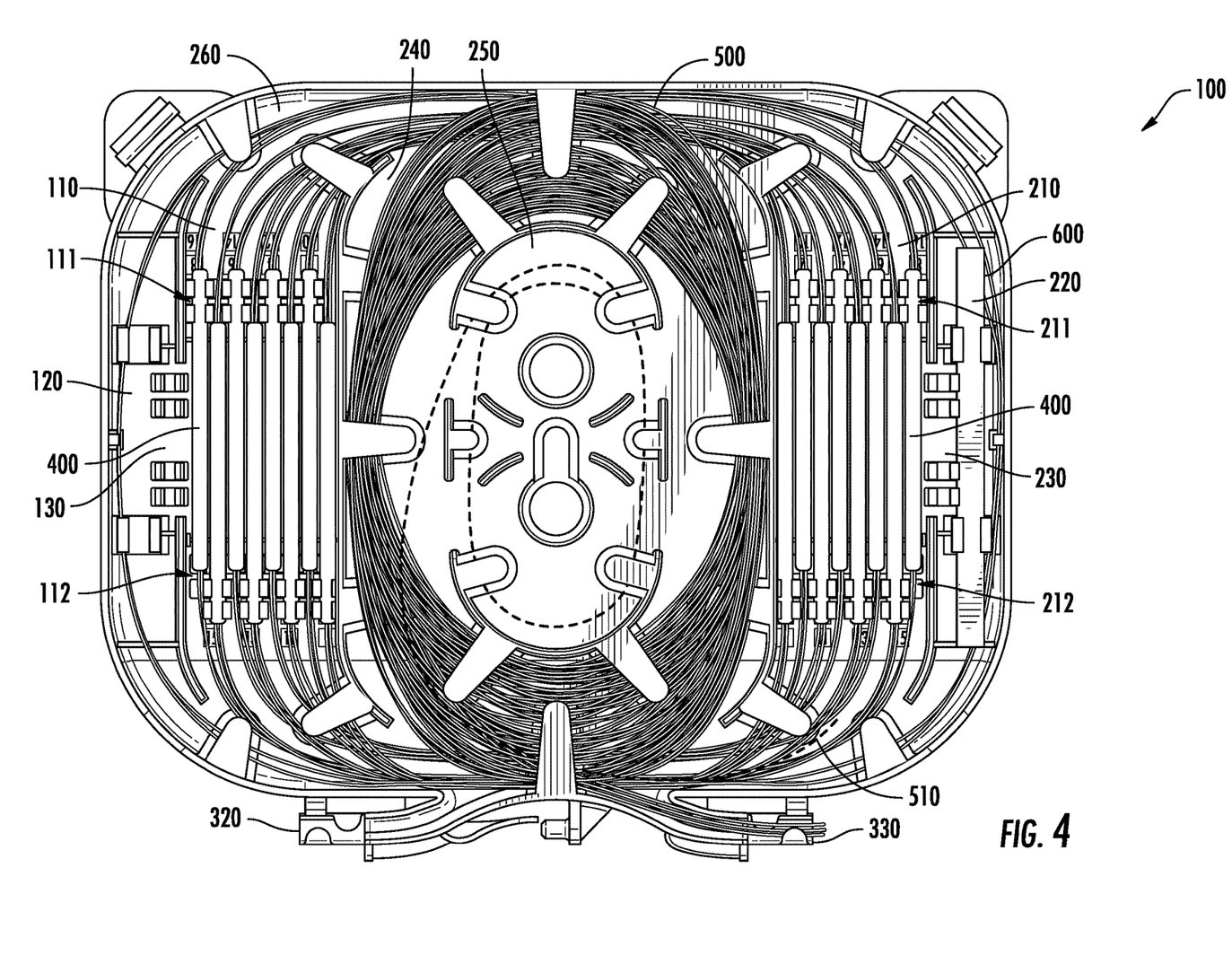
FIG. 4 illustrates an in situ top view of an exemplary fiber-optic apparatus according to an embodiment and including an exemplary optical fiber route within the apparatus.

FIG. 4 illustrates an in situ top view of an exemplary fiber-optic tray 100 according to an example and including an exemplary optical fiber route within the tray 100.

FIG. 4 shows a fiber-optic tray 100 with an exemplary optical fiber route through the tray 100, in which two input optical fibers 500 enter the second fiber input/output region 330 of the tray 100 and the two optical fibers 500 are routed through the first fiber management portion 240. The two optical fibers 500 are then routed through the third fiber management portion 260 to an optical splitter 600 retained on the second optical splitter portion 220. It should be noted that, in alternative examples, the input fibers may be spliced prior to being routed to the optical splitter 600. These splices 400 may be retained in any of the first, second, third or fourth fiber splicing portions 110, 210, 130, 230. Preferably, the splices 400 for the input fibers 500 are retained on the third or fourth fiber splicing portion 130, 230. The fiber is then split into 32 output optical fibers 500 by the splitter 600.

The fiber may be split into 2, 4, 8, 16 or 64 optical fibers depending on the type of splitter 600 used. These output optical fibers 500 are then routed through the first fiber management portion 240 in which coils of excess optical fiber 500 are stored. The output optical fibers are then routed to the first and second fiber splicing portions 110, 210 where the fibers 500 are spliced by optical fiber splices 400 retained thereon. In alternative routing examples, the output optical fibers 500 may also be spliced on the third and fourth fiber splicing portions 130, 230. The resulting fibers are then routed through the first and third fiber management portions 240, 260 and can then be routed out of the tray through the first fiber input/output region 320 or the second fiber input/output region 330 once they are ready to be used. It will be appreciated by one of skill in the art that any of the first, second or third fiber management portions 240, 250, 260 may be used to retain excess lengths of optical fiber 500 at any stage during the routing of the fibers 500 through the tray 100, so long as the minimum acceptable bending radius requirements of the fibers 500 are respected. In this routing example, the second fiber management portion 250 is left free of any optical fibers 500. The first, second or third fiber management portions may also retain coils of unused optical fibers which have not yet been connected as illustrated by the dotted line 510.

As is illustrated in FIG. 4, adjacent retaining members 113, 213 of the first and second groups of retaining members 111, 211, 112, 212 are spaced apart to accommodate the optical fibers 500 of the splices 400 retained by the other group of retaining members.

Any examples of the tray described herein may be installed within a fiber optic equipment housing such as a fiber housing box, break-out box, fiber closure or splice closure. Such closures can be provided in a range of sizes, they can be deployed above grade (pole, facade) or below grade (manhole, handhole). These closures can be used, for example, for fiber-to-the-Home (FTTH) deployments and any type of optical fiber cable deployment in the outside plant. Such enclosures may be formed as a weatherproof encasement, optionally made of plastic, that envelops the exposed area between spliced cables and that can be opened to provide access to the fibers inside.

As used herein, the terms "fiber-optic cables" and/or "optical fibers" include all types of single mode and multi-mode light waveguides, including one or more optical fibers that may be uncoated, colored, buffered, ribbonized and/or have other organizing or protective structure in a cable such as one or more tubes, strength members, jackets or the like. Likewise, other types of suitable optical fibers include bend-insensitive optical fibers, or any other expedient of a medium for transmitting light signals. An example of a bend-insensitive optical fiber is ClearCurve® Multimode fiber commercially available from Corning Incorporated.

It is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A fiber-optic storage tray, comprising:
   a base;
   a fiber management portion disposed on the base;
   a first optical splitter portion disposed on a first side of the fiber management portion and a second optical splitter portion disposed on a second side of the fiber management portion, each of the first and second optical splitter portions being configured to retain an optical splitter;
   a first fiber splicing portion disposed on the first side of the fiber management portion and configured to retain a first plurality of optical fiber splices connecting to the optical splitter retained by either the first or second optical splitter portions;
   a second fiber splicing portion disposed on the second side of the fiber management portion and configured to retain a second plurality of optical fiber splices;
   a third fiber splicing portion disposed between the first fiber splicing portion and the first optical splitter portion and configured to provide space to retain optical fiber splices which feed into at least one the optical splitter; and
   a fourth fiber splicing portion disposed between the second fiber splicing portion and the second optical splitter portion and configured to provide space to retain optical fiber splices which feed into at least one of the optical splitter,
   wherein the first fiber splicing portion is separated from the fiber management portion by a first containment wall and the second fiber splicing portion is separated from the fiber management portion by a second containment wall;
   wherein the second side of the fiber management portion is opposite the first side of the fiber management portion;
   wherein the first fiber splicing portion is configured to retain the plurality of first optical fiber splices such that an end of at least a first optical fiber splice is offset from an end of at least a second optical fiber splice in a depth direction of the apparatus; and
   wherein the storage tray is symmetric about a line extending through a center of the tray and separates the first and second side of the fiber management portion.

2. The fiber-optic storage tray according to claim 1, wherein the first fiber splicing portion is configured to retain the first plurality of optical fiber splices such that at least a third optical fiber splice and at least the first optical fiber splice are offset with respect to one another in a length direction.

3. The fiber-optic storage tray according to claim 1, wherein the first fiber splicing portion comprises a plurality of splice retaining members configured to retain the first plurality of optical fiber splices.

4. The fiber-optic storage tray according to claim 3, wherein each respective optical fiber splice of the first plurality of optical fiber splices is retained by a single respective splice retaining member of the plurality of splice retaining members.

5. The fiber-optic storage tray according to claim 3, wherein the plurality of splice retaining members are arranged in the first fiber splicing portion in a first group of splice retaining members and a second group of splice retaining members.

6. The fiber-optic storage tray according to claim 5, wherein each splice retaining member of the first group of splice retaining members is configured to engaged with a respective optical fiber splice at or near an end of said optical fiber splice closest to a first edge of the apparatus and wherein each splice retaining member of the second group of splice retaining members is configured to engage with a respective optical fiber splice at or near and end of said optical fiber splice closest to a second edge of the apparatus.

7. The fiber-optic storage tray according to claim 5, wherein at least some of the splice retaining members of the first group are configured to retain a optical fiber splices at a first height relative to the apparatus and at least some of the splice retaining members of the second group are configured to retain optical fiber splices at a second height relative to the apparatus, the second height being different to the first height.

8. The fiber-optic storage tray according to claim 7, wherein at least some of the splice retaining members of the first group are configured to retain a optical fiber splices at the second height relative to the apparatus and at least some of the splice retaining members of the second group are configured to retain optical fiber splices at the first height relative to the apparatus.

9. The fiber-optic storage tray according to claim 8, wherein the splice retaining members of the first group of splice retaining members and the splice retaining members of the second group of splice retaining members are each arranged in respective first and second rows of splice retaining members; and
wherein the second row of splice retaining members of the first group is configured to retain a optical fiber splices at the second height relative to the apparatus and the second row of splice retaining members of the second group is configured to retain optical fiber splices at the first height relative to the apparatus.

10. The fiber-optic storage tray according to claim 8, wherein the optical fiber splices retained at the first height relative to the base of the apparatus define a first level of optical fiber splices, and the optical fiber splices retained at the second height relative to the base of the apparatus define a second level of optical fiber splices.

11. The fiber-optic storage tray according to claim 10, wherein the optical fiber splices of the second level of optical fiber splices are retained directly above the optical fiber splices of the first level of optical fiber splices.

12. The fiber-optic storage tray according to claim 1, wherein the first optical splitter portion comprises a first splitter retaining member configured to retain the optical splitter.

13. The fiber-optic storage tray according to claim 12, wherein the first optical splitter portion comprises a further splitter retaining member configured to retain an optical splitter.

14. The fiber-optic storage tray according to claim 1, wherein the second fiber splicing portion is configured to retain the second plurality of optical fiber splices such that an end of at least a first optical fiber splice is offset from an end of at least a second optical fiber splice in the depth direction of the apparatus.

15. The fiber-optic storage tray according to claim 14, wherein the first fiber splicing portion and the second fiber splicing portion are each configured to retain up to 16 optical fiber splices.

16. The fiber-optic storage tray according to claim 1, wherein the fiber management portion is configured to retain coils of excess optical fiber.

17. The fiber-optic storage tray according to claim 1, further comprising a second fiber management portion, wherein the fiber management portion circumscribes the second fiber management portion.

18. The fiber-optic storage tray according to claim 17, further comprising a third fiber management portion, wherein the third fiber management portion circumscribes the first fiber splicing portion, the second fiber splicing portion, the third fiber splicing portion, the fourth fiber splicing portion, the first optical splitter portion, the second optical splitter portion, and the fiber management portion.

* * * * *